United States Patent Office 3,530,043
Patented Sept. 22, 1970

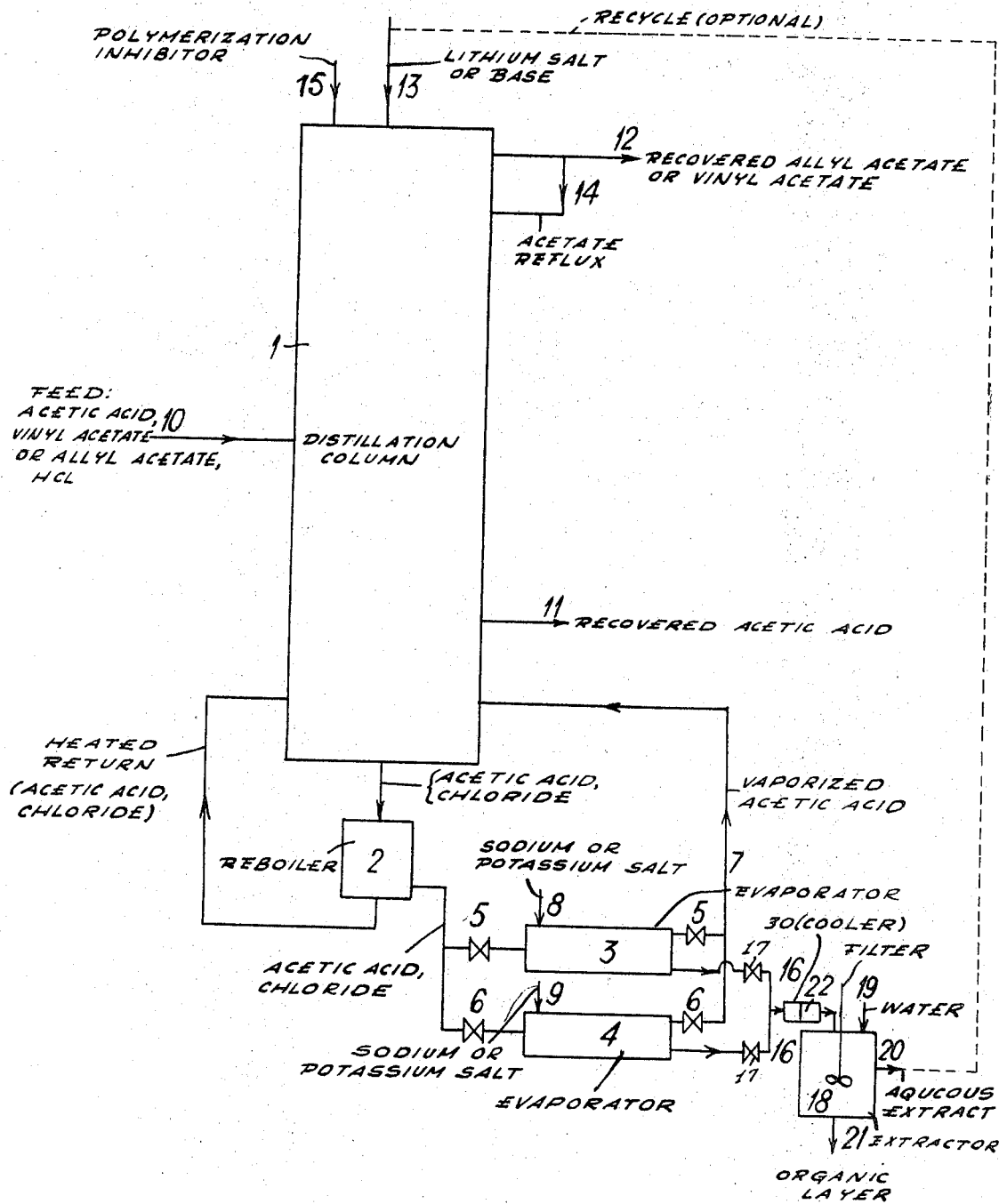

3,530,043
PURIFICATION OF VINYL OR ALLYL ACETATE BY TREATMENT WITH ALKALI METAL COMPOUNDS DURING DISTILLATION AND EVAPORATION WITH PURGING OF CONCENTRATE STREAMS
Peter Edwin Horn and Ronald Wales, Stockton-on-Tees, England, assignors to Imperial Chemical Industries Limited, London, England, a corporation of Great Britain
Filed Feb. 14, 1969, Ser. No. 799,234
Claims priority, application Great Britain, July 4, 1968, 31,928/68
Int. Cl. B01d 3/34; C07c 67/06
U.S. Cl. 203—4                                    9 Claims

ABSTRACT OF THE DISCLOSURE

Mixtures of vinyl or allyl acetate and acetic acid containing hydrogen chloride are distilled in a column, a lithium salt being added at the column top and a purge being taken from the column base the purge being evaporated in the presence of a sodium or potassium salt to precipitate sodium or potassium chloride which is discarded thereby removing hydrogen chloride which tends to corrode the distillation column and to catalyse the hydrolysis of the vinyl or allyl acetate during the distillation. A purge is also drawn from the evaporator from which valuable lithium acetate is recovered by water extraction.

---

The present invention relates to the distillation of unsaturated esters, in particular to the distillation of vinyl acetate and allyl acetate.

In copending U.S. application Ser. No. 799,233, there is described a process for the distillation of a mixture of acetic acid with vinyl acetate or with allyl acetate, which mixture contains hydrogen chloride or chlorine containing compounds capable of giving rise to hydrogen chloride, which comprises distilling the mixture in a distillation column, removing material from the base of the column evaporating this material in the presence of a sodium or potassium salt, returning the evaporated vapours to the column and introducing a lithium salt to the top of the column. At least part of the hydrogen chloride is precipitated as sodium or potassium chloride in an evaporator in which the evaporation takes place. The lithium salt which is introduced to the top of the column is, we believe, converted in passing down the column to lithium chloride which in turn reacts with the sodium or potassium salt in the evaporator. In the evaporator the concentration of acetic acid is such that the lithium is present as lithium acetate which is soluble in the acetic acid medium. In addtion to the inorganic salts organic compounds are also present in the evaporator. Thus when the mixture of vinyl acetate and acetic acid or allyl acetate and acetic acid is derived from the process such as that described in British patent specification No. 964,001 organic products such as polyvinyl acetate, diacetoxyethane, ethylidene diacetate and 2-chloroethyl acetate may be present in the evaporator. As these compounds are higher boiling than acetic acid they tend to increase in concentration together with the lithium acetate which is continuously being formed. When the sodium or potassium chloride is removed from the evaporator therefore it is necessary to remove lithium acetate in solution in acetic acid, and one or more of the organic products referred to above.

Although the sodium or potassium chloride and the organic products with the exception of the acetic acid are of little value and can be put to waste the lithium content of the evaporator purge is of value.

According to the present invention therefore a process for the distillation of a mixture of acetic acid with vinyl acetate or with allyl acetate which mixture contains hydrogen chloride or chlorine containing compounds capable of giving rise to hydrogen chloride comprises distilling the mixture in a distillation column, introducing a lithium salt to the top of the column, removing material from the base of the column, evaporating this material in the presence of a sodium or potassium salt, removing a liquid purge from the material under evaporation, cooling and filtering this purge, extracting the filtrate with hot water, and separating an aqueous solution of lithium acetate from the extraction.

Preferably the evaporated vapours comprising acetic acid are continuously returned to the column.

As described above at least part of the hydrogen chloride is precipitated as sodium or potassium chloride in an evaporator in which the evaporation takes place.

The vinyl acetate or allyl acetate/acetic acid mixture may contain other components providing these latter do not exercise an adverse effect on the process. Thus in a process as described in specification No. 964,001 the product of the process which is submitted as feed to the distillation process of the present invention may comprise water, acetaldehyde, methyl acetate, ethylene glycol diacetate and ethylidene diacetate as well as other products. The chlorine content of the mixture may be up to 0.5% by weight or more and this may comprise organic chlorine compounds particularly organic chlorine compounds which are hydrolysable by water to give rise to hydrogen chloride. Typically a feed mixture for the process of the present invention comprises 15 to 30% by weight vinyl acetate, 40 to 65% by weight acetic acid and the balance water, acetaldehyde and hydrolysable chlorine-containing impurities.

The vinyl acetate or allyl acetate/acetic acid mixture is suitably introduced at the approximate mid-point of the distillation column and vinyl acetate or allyl acetate taken off at the top and acetic acid at the bottom of the column. Other high boiling esters such as ethylene glycol diacetate and ethylidene diacetate if these be present pass down the column with the acetic acid. When vinyl acetate is the ester to be separated the column head temperature is usually 73° C., i.e. the boiling point of vinyl acetate under the preferred operating pressure which is atmospheric pressure. The column head temperature may be less than this figure however depending on whether or not other low boiling components such as acetaldehyde are present in the feed mixture. In the presence of water vinyl acetate forms an azeotrope boiling point 66° C. and this becomes the approximate column head temperature. Similarly with allyl acetate the column head temperature may be 103° C., the boiling point of allyl acetate or 83° C. the boiling point of the allyl acetate/water azeotrope. The temperature at the base of the column is suitably about the boiling point of acetic acid i.e. 118° C. but as it is preferred to remove the acetic acid as a sidestream some distance from the exact bottom of the column the column base temperature may be some few degrees above this e.g. 125° to 160° C.

The distillation column is preferably provided with a reboiler which is fed from the base of the column with material which is heated and returned to the column in continuous circulation. Provision may then be made to withdraw part of the material from the reboiler either intermittently or preferably continuously and to feed it to the evaporator. The vapours from the evaporator are largely acetic acid and these are preferably fed back to the distillation column. A solid residue which is obtained in the evaporator consists essentially of sodium chloride or potassium chloride. The evaporator may be operated at a temperature in the range 120° to 200° C. particularly 135° to 150° C. and preferably at atmospheric pressure.

The lithium salt introduced to the top of the column is a salt capable of giving rise to lithium chloride in contact with hydrogen chloride. Lithium carbonate or a lithium carboxylate e.g. an alkanoate containing up to six carbon atoms such as lithium acetate may be used, but lithium hydroxide which is readily available is most conveniently employed. The lithium salt may be added in a molar amount up to five times the molar amount of hydrogen chloride. Preferably however the molar amount of lithium salt is about twice the molar amount of hydrogen chloride. The lithium salt is preferably added continuously.

The sodium or potassium salt which is introduced to the evaporator is a salt capable of giving rise to sodium or potassium chloride in contact with lithium chloride. Although sodium or potassium carbonate or sodium or potassium carboxylates e.g. alkanoates containing up to six carbon atoms such as sodium acetate may be used, for reasons of convenience the hydroxides, particularly sodium hydroxide are preferred. The sodium or potassium salt which is preferably introduced continuously may be added in a molar amount up to five times the molar amount of lithium chloride present, preferably in a molar amount about twice the molar amount of lithium chloride present.

The removal of the solid residue from the evaporator is not easily carried out when the evaporator is being continuously fed with material from the base of the column. In a preferred form of the invention therefore two evaporators are provided each being capable of being isolated from the distillation column at will. One evaporator is thus in use while the other is being cleaned out and the change from the one to the other may take place without disruption of the process.

The liquid purge removed from the material under evaporation contains some solid sodium or potassium chloride in suspension. This solid is removed by filtration.

The purge may be withdrawn from the evaporator either continuously or batchwise. The temperature of the purge is the temperature within the evaporator and this is reduced by cooling. The filtered purge may comprise a small amount of sodium or potassium chloride in solution, acetic acid, diacetoxyethane, ethylidene diacetate, 2-chloroethyl acetate and polyvinyl acetate together with lithium acetate in solution. The filtrate is treated with hot water preferably at a temperature between 80° to 100° C. when the lithium acetate is extracted leaving the organic residue behind. As the organic residue may contain a large proportion of polyvinyl acetate it may be viscous and sticky. To facilitate handling therefore an inert water immiscible solvent may be added before the water extraction. If desired more than one extraction with hot water may be carried out. The aqueous solution of lithium acetate obtained may be recycled to the top of the distillation column to provide part or all of the lithium salt introduced at this point.

The unsaturated esters which comprise the feedstock of the process of the present invention both polymerise readily. To avoid this polymerisation taking place in the distillation column it is preferred to provide for a polymerisation inhibitor e.g. hydroquinone in the distillation column.

Without wishing to be limited in any way by the following explanation we believe, as summarised earlier, that the lithium salt reacts with hydrogen chloride in the distillation column to form lithium chloride which passes down the column and thence to the evaporator. Unlike sodium and potassium chlorides lithium chloride is soluble in the acetic acid and hence does not precipitate in the distillation column (or reboiler). In the evaporator the lithium chloride undergoes a double decomposition reaction with the sodium or potassium salt (usually in the form of sodium or potassium acetate because of the acetic acid medium) e.g.

$$LiCl + NaOAc \rightarrow NaCl + LiOAc$$

The sodium or potassium chloride being insoluble precipitates. The removal of chloride in this way minimises the reverse reaction.

$$LiCl + HOAc \rightarrow HCl + LiOAc$$

and also provides additional lithium acetate. By removing hydrogen chloride in this way the latter is prevented from catalysing the undesirable reaction referred to above and is also prevented from contaminating the vinyl acetate or allyl acetate and acetic acid products of the distillation.

The invention will now be further described with reference to the following example in which a suitable distillation apparatus is shown in the attached diagram.

EXAMPLE

The distillation apparatus comprises a column 1, reboiler 2 and twinned evaporators 3 and 4. The evaporators are provided with isolation valves 5 and 6, a common vapour return line 7 and facilities for continuously adding sodium salt 8 and 9 respectively. Purge lines 16 lead via isolation valves 17, cooler 30 and filter 22 to an extractor 18 provided with a water inlet 19 and phase removal lines 20 and 21 respectively. A feed inlet line 10 is provided to the column and also acetic acid and vinyl acetate removal lines 11 and 12 respectively. Vinyl acetate is fed back to the column as reflux through line 14. Means for introducing the lithium salt 13 and hydroquinone 15 are provided at the top of the column.

The feed mixture derived from the palladium catalysed oxidation of ethylene in the presence of oxygen, acetic acid, lithium acetate, lithium chloride and copper chloride as described in British patent specification No. 964,001 comprises typically vinyl acetate 25%, acetaldehyde 15%, water 12%, by-products approximately 21% the balance being acetic acid (the percentage being by weight).

The mixture is introduced to the column at a temperature of 60° to 80° C., the column head temperature being 63° C. and the column base temperature 135° C. under atmospheric pressure. A vinyl acetate/water azeotrope is removed through line 12 and acetic acid through line 11. Material is circulated continuously through the reboiler 2 from which a purge is taken to one of the two evaporators. Each evaporator is capable of being isolated by means of the valves 5 or 6 while its twin is in operation. The evaporators are heated to 140° C. to 145° C. and the vapours removed via 7 and returned to the column. Periodically the evaporators are changed over to enable solid deposit to be removed. This deposit consists essentially of sodium chloride.

A typical composition of the filtered purge taken from the evaporators is:

| | Grams |
|---|---|
| Lithium acetate | 13.25 |
| Sodium chloride | 0.3 |
| Polyvinyl acetate | 15.01 |
| Diacetoxyethane | 10.63 |
| 2-chloroethyl acetate | 1.17 |
| Ethylidene diacetate | 0.79 |
| Acetic acid | 32.43 |

This mixture is stirred in extractor 18 and extracted with 50 grams water at 98° C. for one hour when an aqueous extract is obtained of composition:

| | Grams |
|---|---|
| Water | 50 |
| Lithium acetate | 11.2 |
| Sodium chloride | 0.28 |
| Polyvinyl acetate | 3.1 |
| Diacetoxyethane | 6.83 |
| 2-chloroethyl acetate | 1.06 |
| Ethylidene diacetate | 0.56 |
| Acetic acid | 18.9 |

The organic layer consists of 3 grams and a polymeric precipitate is also obtained. The organic layer and precipitate are washed with an additional 50 grams of water at 98° C. the washing having the composition:

| | Grams |
|---|---|
| Lithium acetate | 2.3 |
| Sodium chloride | 0.05 |
| Diacetoxyethane | 1.89 |
| 2-chloroethyl acetate | 0.10 |
| Ethylidene diacetate | 0.07 |
| Acetic acid | 5.7 |

The aqueous solution of lithium acetate obtained in this way is suitable for feeding back to the distillation column, if desired after concentrating the solution by removing some of the water by evaporation.

The feed rate to the distillation column is typically 1500 mls./hour and in the absence of recycle lithium acetate a 1 molar aqueous solution of lithium hydroxide is introduced continuously through line 13 at a rate of 30–50 mls./hour. A 5 molar sodium hydroxide solution is continuously metered to the evaporators at a rate of 10 mls./hour through line 8 or 9. Hydroquinone may be introduced through line 15 to stabilize the vinyl acetate during the distillation. The chloride contents of the vinyl acetate and acetic acid as removed from the still are less than 20 p.p.m. The chloride content of the material circulating through the reboiler is maintained at less than 0.06 molar.

What is claimed is:

1. In a process for separating acetic acid from vinyl acetate or allyl acetate by the distillation of a mixture of acetic acid with vinyl acetate or with allyl acetate said mixture containing hydrogen chloride or chlorine containing compounds capable of giving rise to hydrogen chloride, the improvement which comprises distilling the mixture in a distillation column, introducing a lithium salt or hydroxide to the top of the column, to obtain a distillate containing the acetate from the top of the column and recovering acetic acid from the bottom of said column, removing unvapourized material from the base of the column, introducing a sodium or potassium salt to this material and evaporating this material in the presence of the sodium or potassium salt, removing a liquid purge from the material under evaporation, cooling and filtering this purge, extracting the filtrate with hot water, and separating an aqueous extract of lithium acetate from the extraction.

2. The process of claim 1 in which the evaporated vapours are returned to the column.

3. The process of claim 2 in which the lithium salt is lithium carbonate or lithium acetate and said salt or lithium hydroxide is added in a molar amount up to five times the molar amount of hydrogen chloride present.

4. The process of claim 3 in which the sodium or potassium salt is sodium or potassium carbonate, sodium or potassium acetate or sodium or potassium hydroxide added in a molar amount up to five times the molar amount of hydrogen chloride present.

5. The process of claim 1 in which the evaporation is carried out at a temperature in the range of 120° to 200° C.

6. The process of claim 1 in which the temperature of the hot water is between 80° and 100° C.

7. The process of claim 1 in which an inert, water insoluble solvent is added before the water extraction.

8. The process of claim 1 in which the aqueous solution of the lithium acetate is recycled to the top of the distillation column.

9. The process of claim 1 in which material is taken from the base of the column, heated and returned to the column in continuous circulation, material being continuously removed from that in circulation and submitted to the evaporation.

References Cited

UNITED STATES PATENTS

| Re. 25,393 | 6/1963 | Bechtel | 203—13 |
| 722,071 | 3/1903 | Ahlers | 202—70 |
| 2,081,189 | 5/1937 | Wiezevich | 203—33 |
| 2,463,453 | 3/1949 | Beardsley | 203—33 |
| 3,346,626 | 10/1967 | Schaeffer et al. | 260—497 |

FOREIGN PATENTS

| 969,018 | 9/1964 | Great Britain. |
| 1,053,421 | 1/1967 | Great Britain. |
| 1,064,491 | 4/1967 | Great Britain. |

WILBUR L. BASCOMB, JR., Primary Examiner

U.S. Cl. X.R.

203—7, 8, 33, 37, 38, 43, 47, 98, 99; 202—155; 260—497, 541, 499